United States Patent
Shida et al.

(10) Patent No.: US 7,660,288 B2
(45) Date of Patent: Feb. 9, 2010

(54) RADIO COMMUNICATION DEVICE

(75) Inventors: Masaaki Shida, Hachioji (JP);
Shigenori Hayase, Kodaira (JP);
Tomoaki Ishifuji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 454 days.

(21) Appl. No.: 11/493,556

(22) Filed: Jul. 27, 2006

(65) Prior Publication Data
US 2007/0086400 A1    Apr. 19, 2007

(30) Foreign Application Priority Data
Oct. 14, 2005    (JP) .............................. 2005-299504

(51) Int. Cl.
*H04J 1/00*    (2006.01)
(52) U.S. Cl. ................. 370/343; 370/319; 370/430; 455/526
(58) Field of Classification Search ................. 370/338, 370/343, 344, 210; 375/260, 130, 349, 355; 455/526
See application file for complete search history.

(56) References Cited

U.S. PATENT DOCUMENTS

| 7,298,805 | B2 * | 11/2007 | Walton et al. | 375/347 |
|---|---|---|---|---|
| 2004/0131011 | A1 * | 7/2004 | Sandell et al. | 370/210 |
| 2005/0111599 | A1 | 5/2005 | Walton et al. | |
| 2005/0226447 | A1 * | 10/2005 | Miller | 381/318 |
| 2006/0067417 | A1 * | 3/2006 | Park et al. | 375/260 |
| 2006/0189280 | A1 * | 8/2006 | Goldberg | 455/101 |
| 2006/0281422 | A1 * | 12/2006 | Pan et al. | 455/127.1 |

FOREIGN PATENT DOCUMENTS

JP    2005-175678    6/2005

OTHER PUBLICATIONS

Eduardo F. Casas, et al., OFDM for Data Communication Over Mobile Radio FM Channels-Part I:, IEEE Transaction on Communication, vol. 39, No. 5, May 1991, pp. 783-793.
IEEE Std 802.11a-1999, pp. 1-83.
IEEE Std 802.11g-2003, pp. 1-67.
IEEE802.11-04/0889r5, May 13, 2005.

* cited by examiner

*Primary Examiner*—Dang T Ton
*Assistant Examiner*—Mandish Randhawa
(74) *Attorney, Agent, or Firm*—Antonelli, Terry, Stout & Kraus, LLP.

(57) ABSTRACT

Disclosed is a wireless communication system capable of performing demodulation at the receiving side without substantially deteriorating BER characteristics, regardless of carrier frequency error existing among plural wireless communication systems in SDMA of uplink. The wireless communication system includes plural antennas; a MIMO processor that decomposes a reception signal the plural antennas received from plural transmitters into transmission signals transmitted from the respective transmitters; a FFT processor that carries out OFDM demodulation; and a demapping unit that obtains data from signals which were previously converted into sub-carrier signals by the FFT processor, in which the MIMO processor is installed ahead of the FFT processor for sake of the processing sequence of a receive signal, and even though a carrier frequency offset exists in the reception signal MIMO processing is performed prior to OFDM demodulation to split the reception signal from plural transmitters.

6 Claims, 11 Drawing Sheets

Frequency

RADIO COMMUNICATION DEVICE

CLAIM OF PRIORITY

The present application claims priority from Japanese application JP 2005-299504 filed on Oct. 14, 2005, the content of which is hereby incorporated by reference into this application.

FIELD OF THE INVENTION

The present invention relates in general to a wireless communication system performing Space Division Multiple Access (SDMA) using a plurality of antennas. More specifically, the present invention relates to the construction of a wireless communication system that operates as an access point in a network environment of mixed wireless LAN devices based on a conventional standard and an effective technology to be applied to a control method thereof.

BACKGROUND OF THE INVENTION

There are several technologies for a conventional wireless communication system.

For instance, in a radio communication system composed of an access point and plural user terminals, the same frequency may be used for plural user terminals to transmit data to the access point at the same time, i.e., SDMA, as disclosed in US Pat. Application No. 2005/01115999A1.

In addition, Orthogonal Frequency Division Multiplexing (OFDM) is used as a conventional modulation/demodulation method for realizing high-speed wireless data transmission (Eduardp F. Casas, Cyril Leung, "OFDM for Data Communication Over Mobile Radio FM Channels Part I: Analysis and Experimental Results", May, 1991, IEEE Transaction on Communications Vol. 39, No. 5, pp. 783-793).

Moreover, the IEEE802.11 standard exists as a conventional wireless LAN system using the OFDM (IEEE Std 802.11a-1999, IEEE, IEEE Std 802.11g-2003, IEEE).

Also, there is Multiple-Input Multiple-Output (MIMO) wireless LAN system, a system using the OFDM for modulation (TGn Sync Proposal Technical Specification, May 13, 2005, IEEE802.11-04/0889r5).

SUMMARY OF THE INVENTION

However, a careful study on these techniques for a conventional wireless communication system revealed the following.

Figure 7:
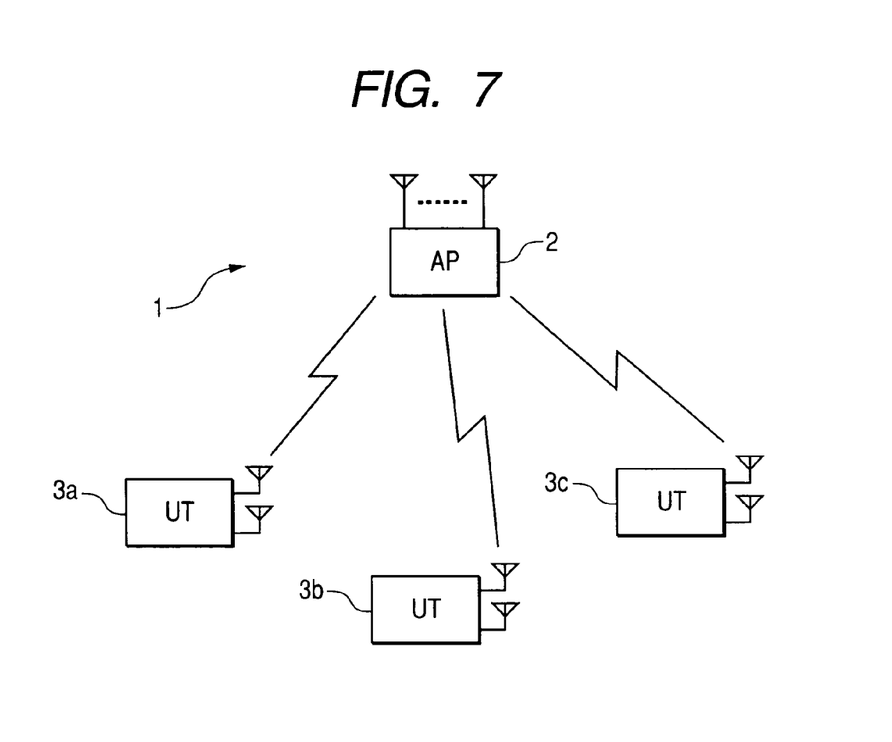
FIG. 7 illustrates a network configuration by SDMA technology, according to a conventional radio communication system.

First of all, as to the technology suggested in US. Pat. Applin. No. 2005/0111599A1, the operation of SDMA is explained with reference to FIG. 7. As depicted in the drawing, a radio communication system 1 comprises an access point (AP) 2 and user terminals (UT) 3 (3a-3c). The access point 2 acquires an uplink channel matrix from the respective user terminals 3, and determines a transmission vector for each of the user terminals 3 so that a total throughput from the user terminals 3 may be maximized. Based on this transmission vector determined for the respective user terminals 3, the user terminals 3 determine signals transmitted from one or more than two antennas. SDMA is, therefore, made possible as all the user terminals 3 transmit signals based on the transmission vectors determined by the access point 2.

Figure 8:
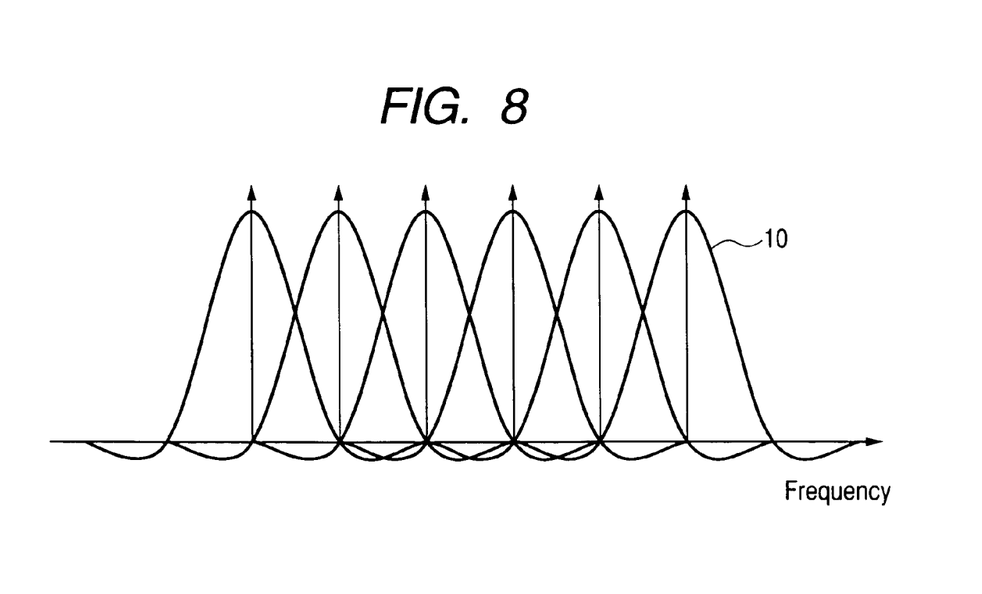
FIG. 8 illustrates an amplitude spectrum of an OFDM signal, according to a conventional radio communication system.
Figure 9:
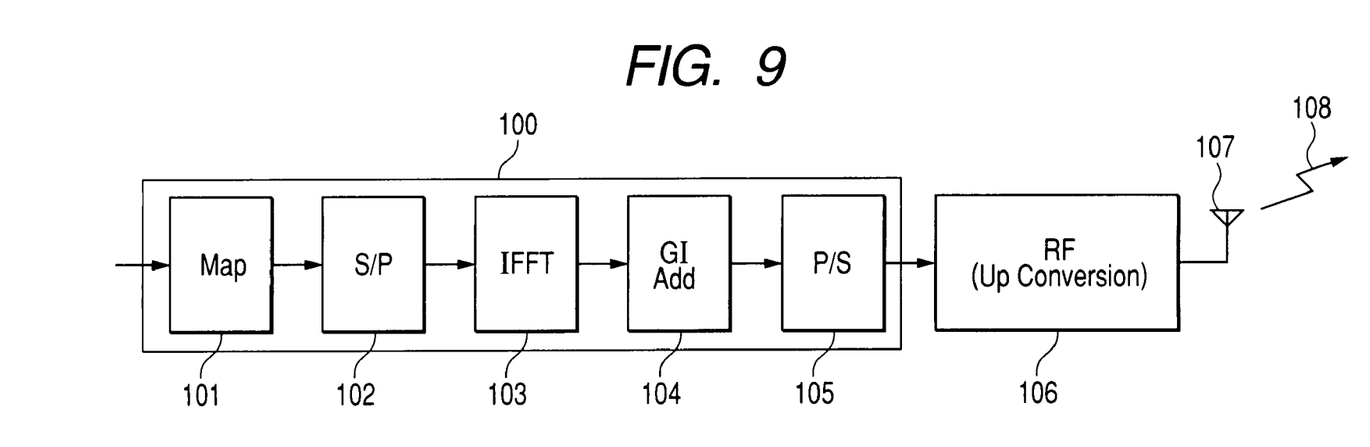
FIG. 9 illustrates the construction of an OFDM transmitter, according to a conventional radio communication system.
Figure 10:
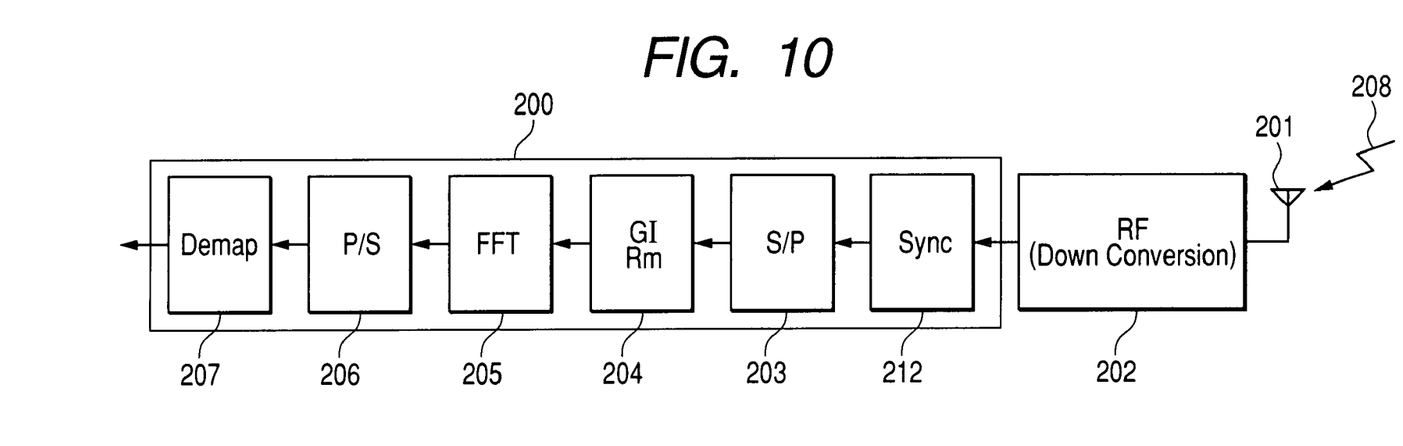
FIG. 10 illustrates the construction of an OFDM receiver, according to a conventional radio communication system.

Next, the technology of the IEEE802.11 standard is explained with reference to FIGS. 8 to 10. FIG. 8 illustrates an amplitude spectrum of an OFDM signal. OFDM works by splitting a high speed data signal into plural sub-carriers 10 that are then transmitted to a receiver. Since each sub-carrier 10 is transmitted at low rate, the influence of multipath, which is typically observed in radio communication, can be decreased or removed.

Modulation procedure of OFDM is now described with reference to FIG. 9. Transmission data are converted into baseband OFDM signals in an OFDM modulator 100. The signal processing sequence is detailed below. The transmission data are mapped in constellation that are defined for the respective modulation methods, such as, Binary Phase Shift Keying (BPSK), Quadrature Phase Shift Keying (QPSK), 16 Quadrature Amplitude Modulation (16QAM), and 64 Quadrature Amplitude Modulation (64QAM). These mapped signals in the constellation are allocated to the sub-carriers 10 by Serial to Parallel (S/P) converter 102. Next, the signals are converted in Inverse Fast Fourier Transform (IFFT) unit 103 into signals on the time axis. In addition, in order to decrease the influence of multipath, Guard Interval (GI) is added to the signals in a GI adder GI Add 104, and the signals are converted into time series signals in a P/S converter 105. Finally, in an RF unit 106, the signals are upconverted to a carrier frequency and radiated into space as transmission signals 108 via an antenna 107.

Demodulation procedure of OFDM is now described with reference to FIG. 10. The received data are converted in an OFDM demodulator 200 into data from baseband OFDM signals. The signal processing sequence is detailed below. A reception signal 208 is inputted to an RF unit 202 via an antenna 201. In the RF unit 202, the signal is down converted into a baseband signal, and goes through carrier frequency offset compensation and symbol synchronization in a synchronization unit sync 212. Through the symbol synchronization, the reception signal is converted into a parallel signal per symbol in an S/P converter 203, and an unnecessary GI is removed therefrom in a GI remover GI Rm 204. The signal free of GI is then converted into data on a frequency axis in a Fast Fourier Transform (FFT) processor 205. Later, the data is temporally serialized in a P/S converter 206, and demodulated as data in a Demap unit 207.

Figure 11:
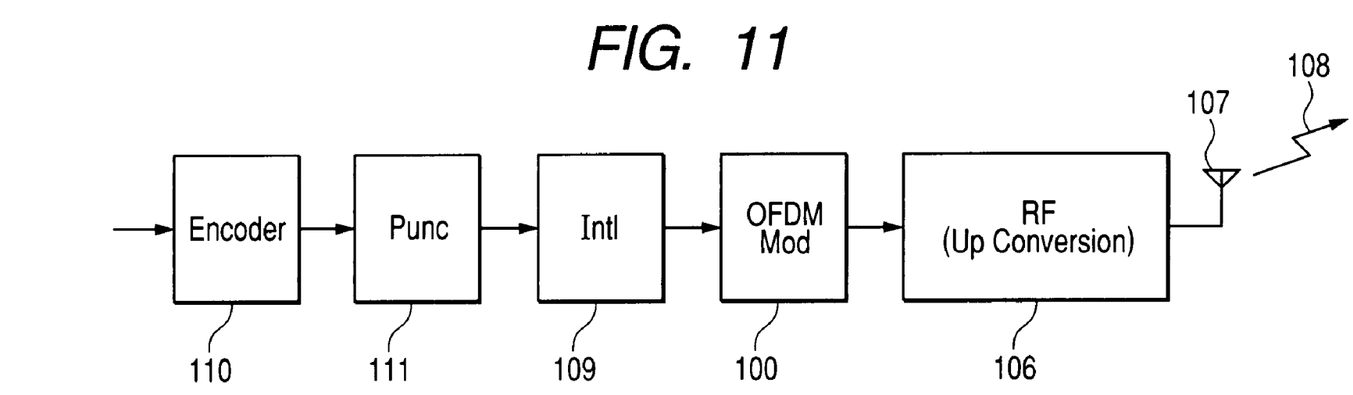
FIG. 11 illustrates a transmitting system of a physical layer in a wireless LAN, according to a conventional radio communication system.
Figure 12:
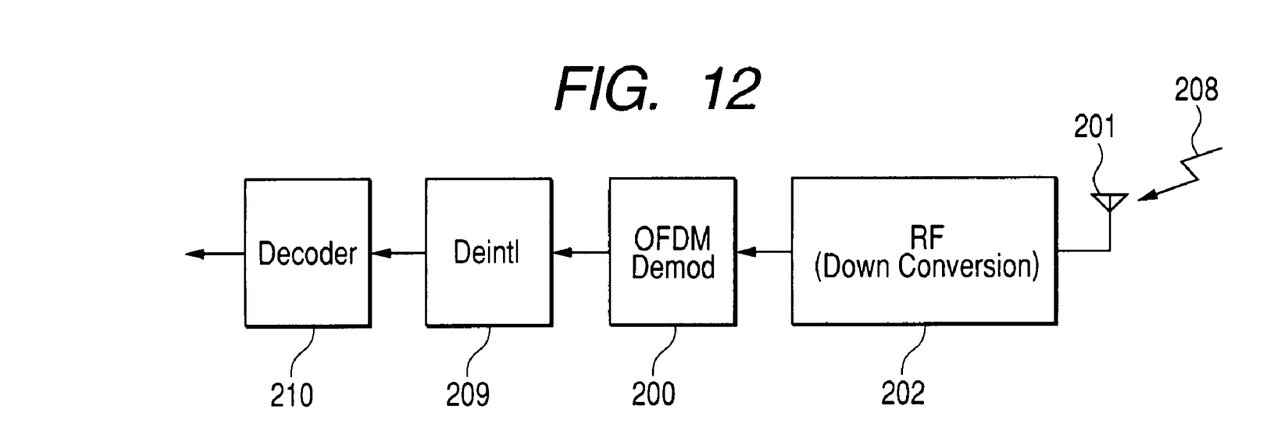
FIG. 12 illustrates a receiving system of a physical layer in a wireless LAN, according to a conventional radio communication system.

With reference to FIGS. 11 and 12, the following now explains the technologies introduced in the IEEE Std 802.11a and the IEEE Std 802.11g regarding the constructions and operations of a conventional wireless LAN transmitter and a conventional wireless LAN receiver.

First of all, the transmission system of a physical layer in a conventional wireless LAN system shown in FIG. 11. To increase tolerance to bit error, a transmission data is encoded in an encoder 110 by a convolutional code with a constraint length 7 and a half (½) coding rate. If necessary, some of the encoded bits are omitted in a punctured unit Punc 111 and the final coding rate becomes ¾ for example. An output signal from the Punc 111 is inputted to an interleave unit Intl 109 and substitutes data in the frequency axis direction. The interleaved signal is converted into an OFDM signal in an OFDM modulator OFDM Mod 100, and then a radio frequency signal in an RF unit 106. This RF signal is radiated into space as a transmission signal 108 through an antenna 107.

The receiving system of a physical layer in a conventional wireless LAN system shown in FIG. 12. A reception signal 208 is inputted to an RF unit 202 through an antenna 201. In the RF unit 202, the received RF signal is converted into a baseband signal and inputted to an OFDM demodulator OFDM Demod 200. In an deinterleave unit Deintl 209, output of the OFDM Demod 200 undergoes data substitution contrary to the operation in the Intl 109. An output signal from the Deintl 209 is inputted to a decoder 210, decoded by Viterbi decoding for example and outputted as a received data.

Figure 13:
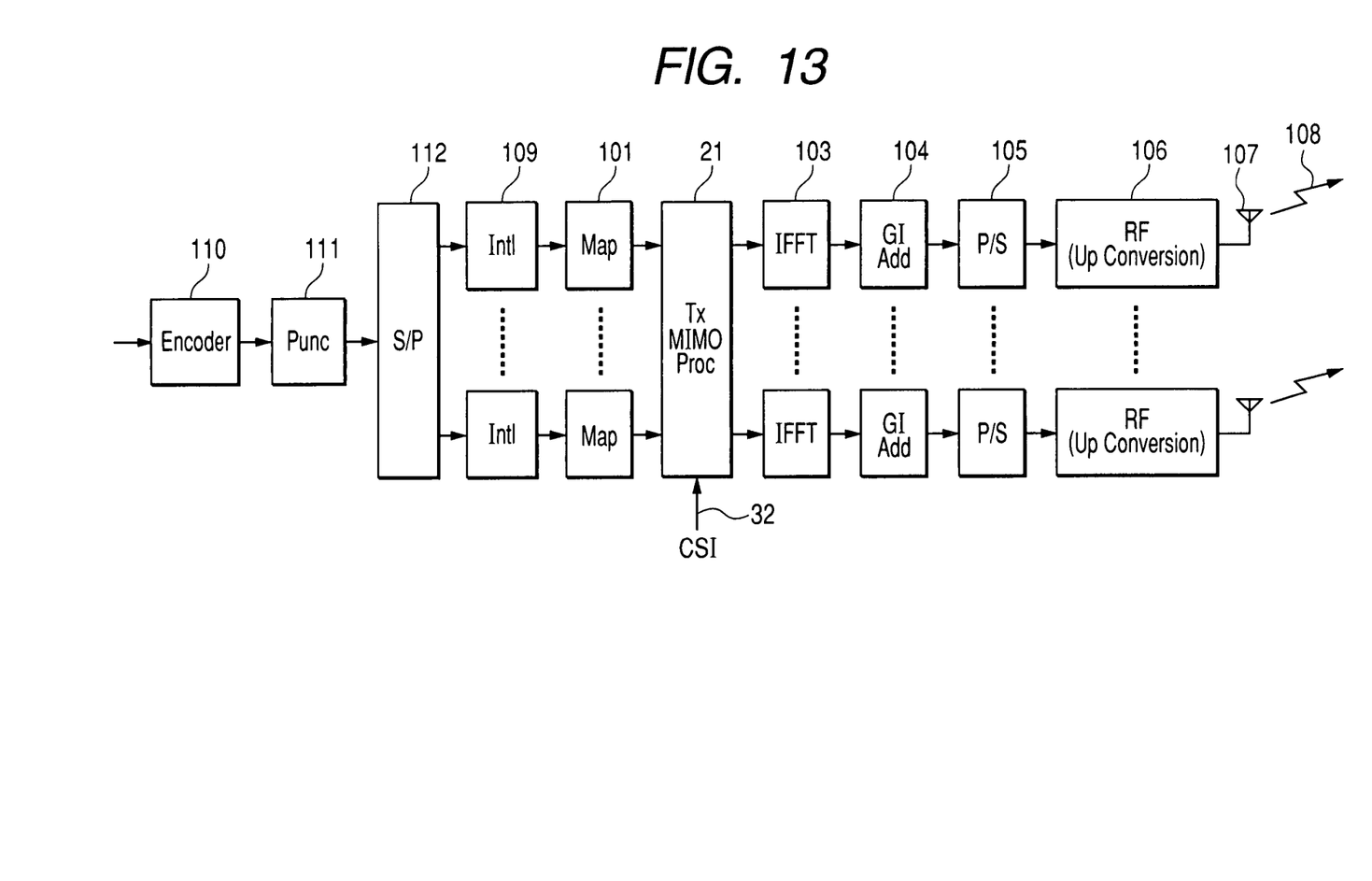
FIG. 13 illustrates a transmitting system of a physical layer in a wireless LAN using MIMO, according to a conventional radio communication system.
Figure 14:
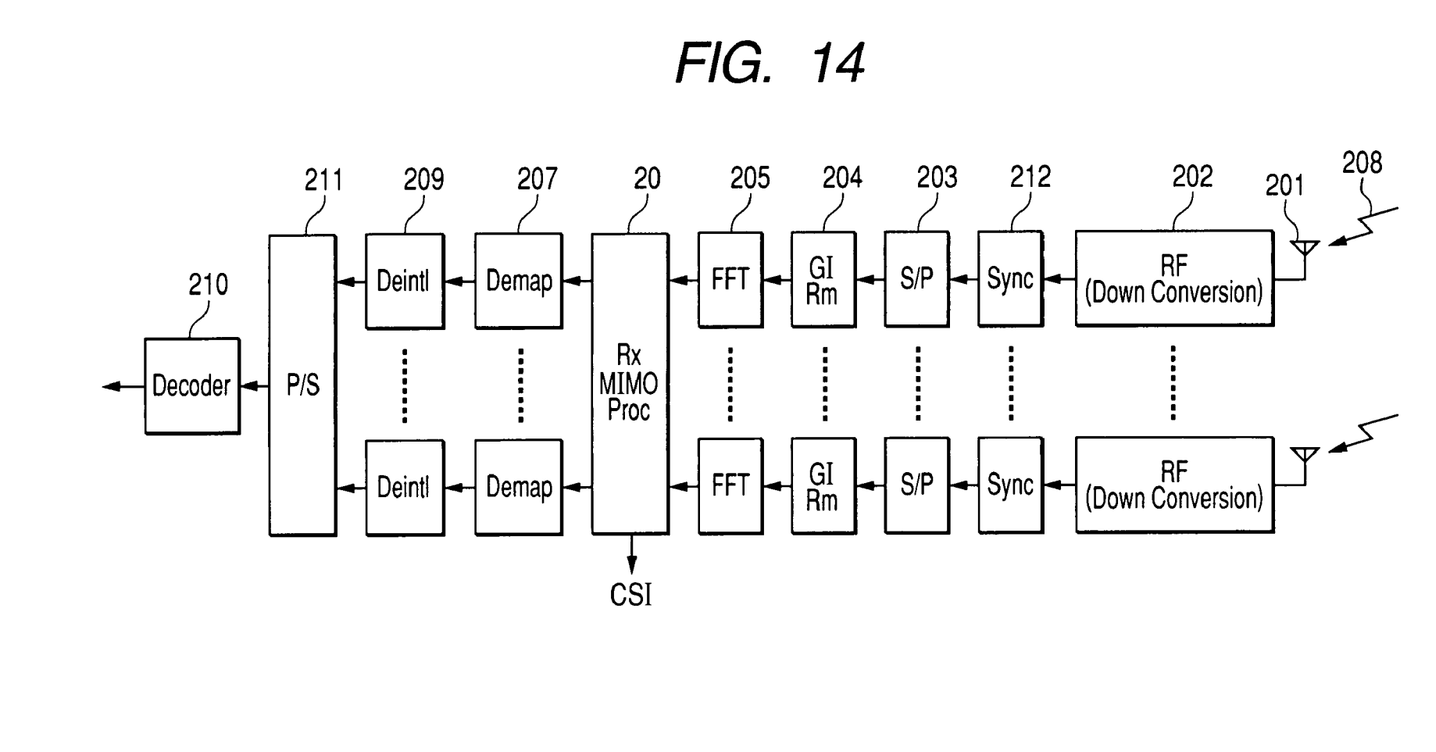
FIG. 14 illustrates a receiving system of a physical layer in a wireless LAN using MIMO, according to a conventional radio communication system.

With reference to FIGS. 13 and 14, the following now explains the technology introduced in the TGn Sync Proposal Technical Specification.

FIG. 13 illustrates the construction of a conventional MIMO transmitter for realizing SDMA. Similar to the OFDM transmitter described above, transmission data are encoded and punctured. Next, an S/P converter 112 converts a signal into a parallel signal according to the number of transmitted streams below the number of transmitting antennas 107. Each of the transmitted streams is interleaved in an Intl 109, and mapped by a mapping unit 101 to constellation. In a transmission MIMO processor Tx MIMO Proc 21, a transmission vector is multiplied to a transmission signal based on Channel State Information (CSI) 32 so as to generate data each antenna 107 transmits. Here, CSI is a channel matrix to at least one wireless communication system where data needs to be sent. For instance, a transmission vector is determined on the basis of a guideline for maximizing the throughput to the respective wireless communication systems.

FIG. 14 illustrates the construction of a conventional MIMO receiver for realizing SDMA. In case of receiving signals simultaneously from more than one wireless communication system, according to the procedure described in the US. Pat. Applin. No. 2005/0111599A1, the wireless communication systems transmit a transmission vector determined by a wireless communication system at the receiving side as it is. The wireless communication system at the receiving side receives from the respective wireless communication systems signals in a superposed state at the antenna 201. These superposed reception signals are decomposed into data streaming from each wireless communication system by a matrix operation in a reception MIMO processor Rx MIMO Proc 20. At this time, since the MIMO processing method of a wireless communication system at the transmitting side is determined by a command of the wireless communication system at the receiving side, it is possible to see in advance how data from each wireless communication system are superposed at the receiving side.

Figure 15:
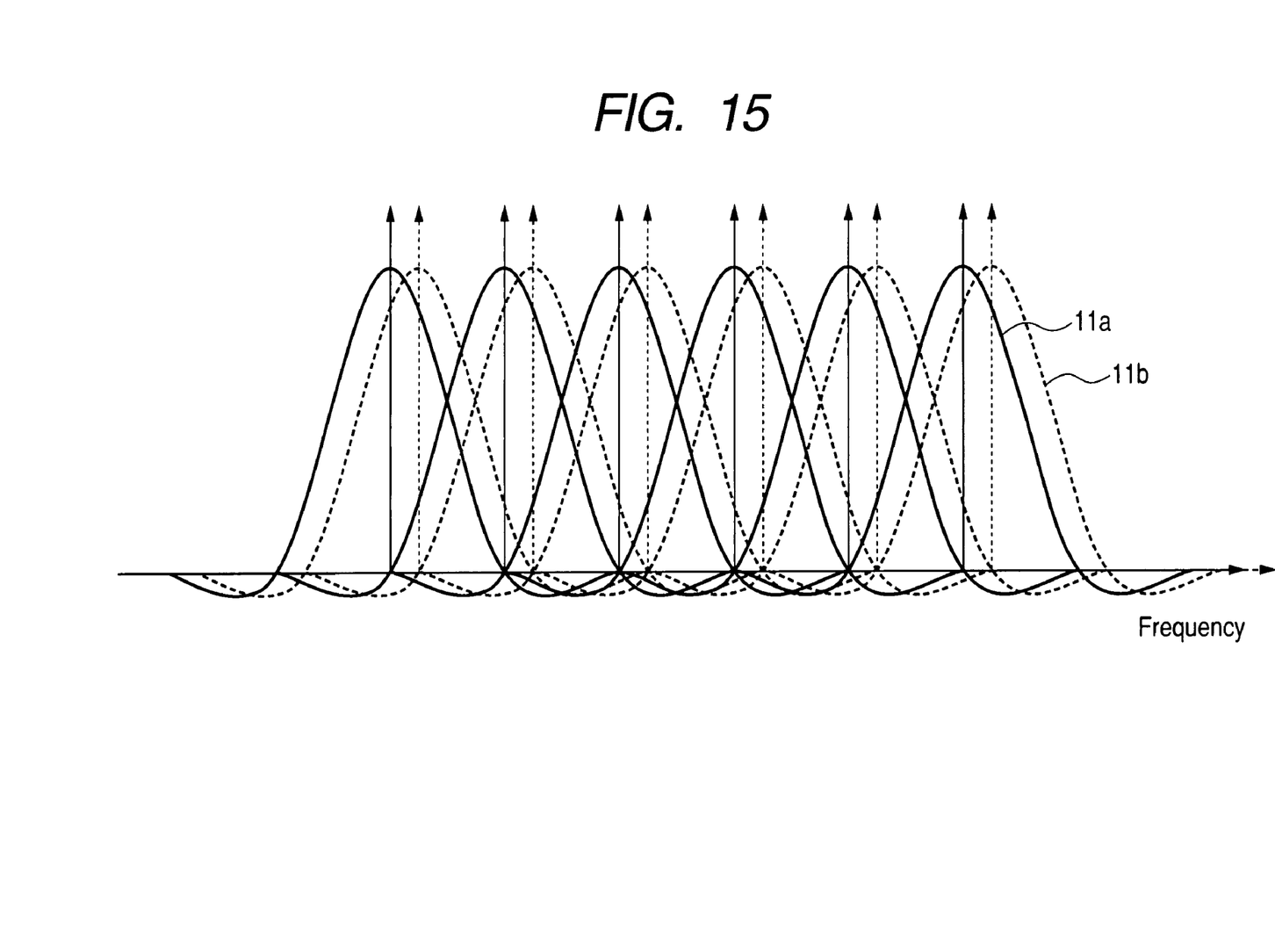
FIG. 15 illustrates an amplitude spectrum of a reception signal from two user terminals having a frequency offset, according to a conventional radio communication system.

However, in the receiver of FIG. 14, as for an uplink receiving signals simultaneously from plural wireless communication systems, an assumption is made that carrier frequencies of the respective wireless communication systems coincide completely and carrier frequency error is not considered. FIG. 15 illustrates an amplitude spectrum of a reception signal in a case where there is a carrier frequency error in signals from the respective wireless communication systems. As shown in the drawing, if there is an error in the carrier frequencies, an amplitude spectrum 11a of the reception signal from a certain wireless communication system is interfered with an amplitude spectrum 11b of a reception signal from another wireless communication system having a carrier frequency error. In consequence, the receiving performance, BER (Bit Error Rate) to be more specific, is deteriorated substantially.

Even though an uplink may use another access method, TDMA for example, instead of SDMA, since in the conventional standard wireless LAN system a response frame is transmitted after some lapse of time following the data frame reception, TDMA cannot be utilized for such response frame. Unfortunately, there has not been any means for solving this.

It is, therefore, an object of the present invention to provide a wireless communication system capable of performing demodulation without the receiving side substantially deteriorating BER (Bit Error Rate) even when a carrier frequency error exists among plural wireless communication systems in an SDMA uplink.

To achieve the above objects and advantages, there is provided a wireless communication system simultaneously receiving OFDM signals within the same frequency band from plural transmitters, which the device includes: plural antennas; first MIMO processor for decomposing a reception signal, the mixed transmission signals the plural antennas received from the plural transmitters, into transmission signals transmitted from the respective transmitters; FFT processor for carrying out OFDM demodulation; and demodulator for obtaining data from signals that were previously converted into sub-carrier signals by the FFT processor, wherein, the first MIMO processor is installed ahead of the FFT processor for sake of the processing sequence of a receive signal.

In addition, to respond a typical point-to-point MIMO communication, second MIMO processor installed at the rear end of the FFT processor. Since the first MIMO processor is not required in this case, it includes a so-called bypass means outputting an input signal as it is.

In addition, the first MIMO processor includes variable gain amplifiers for changing amplitude by a predetermined amount; and phase shifters for changing phase per frequency by a predetermined amount.

Moreover, the wireless communication system of the invention includes a CSI processor, which uses channel information obtained between the wireless communication system and each of different wireless communication systems so as to change the configuration of a transmission signal from the wireless communication system to the different wireless communication systems. As for obtaining channel information between the wireless communication system and each of the different wireless communication systems, the wireless communication system of the invention transmits a control frame requiring a response frame from the different wireless communication systems and obtains channel information using response frames from the different wireless communication systems in response to the control frame.

According to an embodiment of the invention, even though carrier frequency error exists among plural wireless communication systems in SDMA of uplink, demodulation at the receiving side can be done without substantially deteriorating BER characteristics.

BRIEF DESCRIPTION OF THE DRAWINGS

The above aspects and features of the present invention will be more apparent by describing certain embodiments of the present invention with reference to the accompanying drawings, in which like reference numerals refer to like elements, and wherein.

DETAILED DESCRIPTION OF THE PREFERRED EMBODIMENTS

A preferred embodiment of the present invention will be described herein below with reference to the accompanying drawings.

First Embodiment

A first embodiment of the present invention is now explained with reference to FIGS. 1 to 5. While it is not intended to limit the invention, the first embodiment illustrates a case where the present invention is implemented in a wireless LAN.

Figure 1:
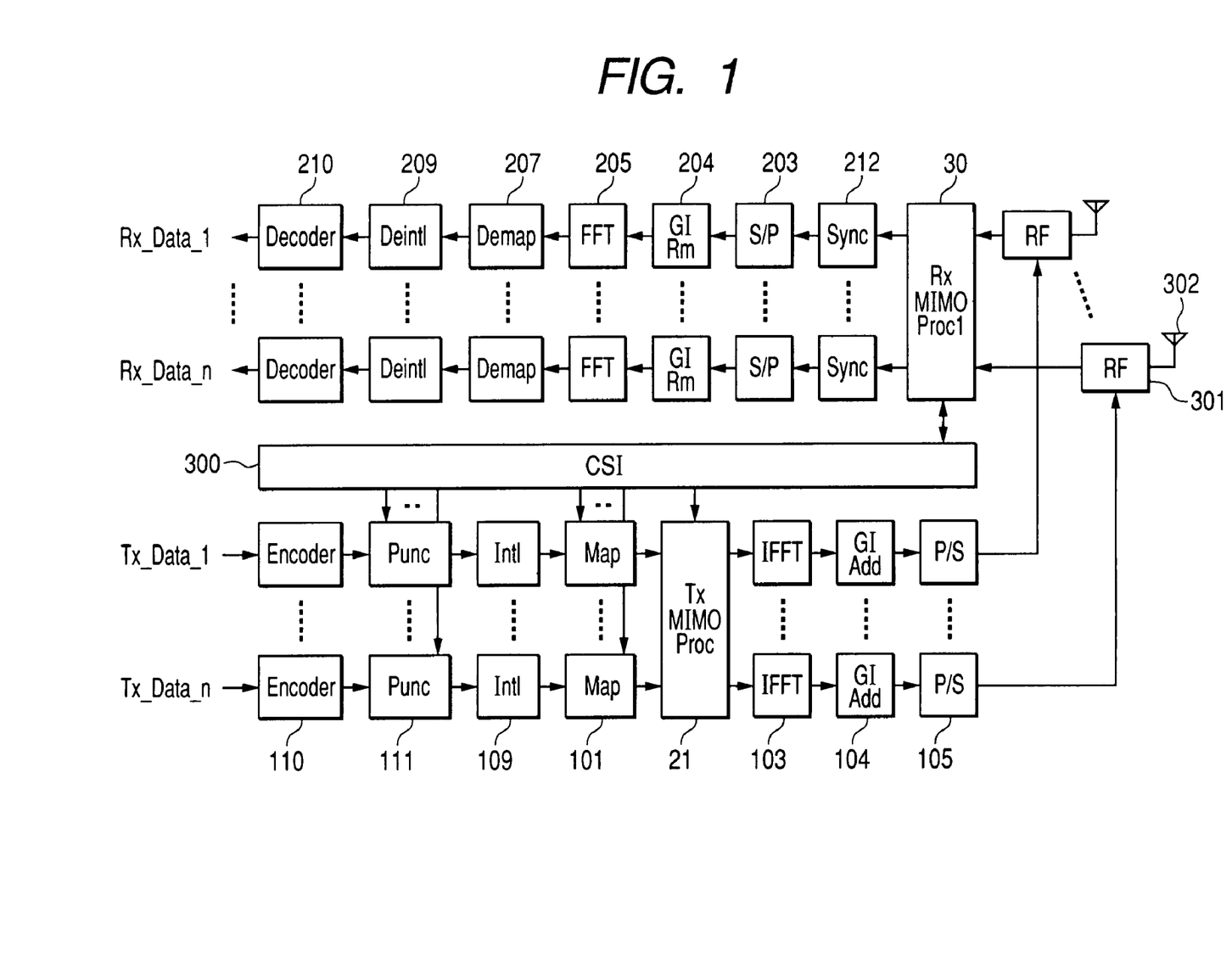
FIG. 1 illustrates the construction of a wireless communication system, according to a first embodiment of the invention.

FIG. 1 illustrates the construction of a wireless communication system according to the first embodiment of the invention. The wireless communication system functions as an access point for a radio communication system which includes an access point and plural user terminals.

As shown in FIG. 1, the wireless communication system in this embodiment includes a transmitting system responding to transmitting data Tx_Data_1-n, the transmitting system having an OFDM encoder 110, a punctured unit Punc 111, an interleave unit Intl 109, a mapping unit Map 101, a transmission MIMO processor Tx MIMO Proc 21, an IFFT processing unit IFFT 103, a GI addition unit GI Add 104, and a P/S converter P/S 105; and a receiving system responding to reception data Rx_Data_1~n, the receiving system having a reception MIMO processor Rx MIMO Proc1 30, a synchronization unit Sync 212, a S/P converter S/P 203, a GI remover GI Rm 204, an FFT processor FFT 205, a demapping unit Demap 207, a deinterleave unit Deintl 209, and a decoder 210. Also, as common parts for the transmitting system and the receiving system, there is a CSI processor 300, a transceiving RF unit 301, and antennas 302. Here, the same components as those of FIGS. 9 to 14 are designated by the same reference numerals, and therefore the explanation of those components will be omitted and only new components will be explained hereinafter.

Particularly, the wireless communication system in this embodiment is a device that receives OFDM signals within the same frequency band simultaneously from plural user terminals. It includes an Rx MIMO processor (first MIMO processor) 30 for decomposing signals plural antennas received from the plural user terminals into signals transmitted from the respective user terminals, an FFT processor 205 for OFDM demodulation, and a demapping unit (demodulator) 207 for obtaining data from signals that are converted by the FFT processor 205 into sub-carrier signals, in which the Rx MIMO Proc1 30 is installed ahead of the FFT processor 205 for sake of the processing sequence of a reception signal.

In the wireless communication system of this embodiment, the number of antennas 302 for use in transmission is set to m, and the number of user terminals for communication at the same time is set to n. Here, n is an integer below m. Also, transmission data to be transmitted to the respective user terminals 1-n are set to a transmission data 1 to a transmission data n, respectively. These transmission data are encoded in the encoder 110 to increase error resistances of them. If necessary, the encoded signals undergo data thinning in the Punc 111 to change coding rate. Later, the Intl 109 changes the data sequence.

Although error correction for random errors is effectively functioned in the decoder during demodulation, it does not function effectively for burst errors and BER characteristics after error correction are degraded. In general, wirelessly transmitted signals may have burstwise interfered with by paging or impulse noise besides the random errors due to white noise. For this reason, the Intl 109 changes the data sequence and returns data row back to the original during demodulation, so that the possibility for the burst error being inputted to the decoder may be decreased.

The output of the Intl 109 is inputted to the Map 101, and mapped to one of constellations among BPSK, QPSK, 16QAM, and 64QAM. Here, CSI from the wireless communication system to a user terminal for transmission is acquired, and coding rate in the Punc 111 and modulation method in the Map 101 are determined referring to a predetermined operation or a predetermined table based on the CSI. The procedure for the CSI processor 300 to acquire CSI to a user terminal for transmission in advance will be described later.

With the mapped signal in a constellation by the Map 101, the Tx MIMO Proc 21 generates the same number of signals as the number of transmitting antennas, m, by a predetermined m×n matrix based on the CSI. Here, the operation at the Tx MIMO Proc 21 makes sure that a transmission data 1 to be transmitted to the user terminal 1 should be cancelled immediately and therefore not received by another user terminal. Similarly, other transmission data are cancelled at the receiving antennas of user terminals except for those of the user terminals where the data are supposed to be transmitted originally.

The output of the Tx MIMO Proc 21 is converted into data on the time axis in the IFFT processor 103, and the GI Add 104 adds GI for reducing multipath interference. In the transceiving RF unit 301 via the P/S converter 105, the signals are upconverted to their respective carrier frequencies and radiated into space via the antenna 302. In this manner, SDMA of downlink is realized.

An uplink is sent simultaneously to the wireless communication system operating as an access point utilizing the same carrier frequency from plural user terminals. Since signals from the user terminals are transmitted within the same frequency, the signals from the respective user terminals are mixed in the antennas 302. This mixed signal is inputted to the transceiving RF unit 301 and down converted to a baseband signal.

The Rx MIMO Proc1 30 carries out a predetermined operation on the down converted signal, on the basis of the CSI information the CSI processor 300 acquired in advance. In result, the signal is decomposed to reception signals from the respective user terminals. The structure for decomposing the reception signals from the respective user terminals will be described later. This structure is sufficient to decompose the reception signals from the respective user terminals despite the existence of frequency offset. This principle will also be explained later.

The decomposed signals as the reception signals from the respective user terminals undergo carrier frequency offset compensation and symbol synchronization, respectively, in the Sync 212. By the symbol synchronization, the reception signals are converted into parallel signals per symbol in the S/P converter 203, and any unnecessary GIs are removed therefrom in the GI Rm 204. In the FFT processor 205, the GI-free signals are then converted into data on the frequency axis and temporally serialized. The Demap 207 outputs the signals as demodulated signals.

These output demodulated signals undergo an operation in the Deintl 209 that is quite the opposite of the one in the Intl 109 and as a result, the bit sequence is returned to its original. The returned signals are inputted to the Decoder 210 and errors are corrected by Viterbi decoding for example. Later, these signals are outputted from the respective user terminals as the reception data 1 to n. In this manner, SDMA of an uplink is realized.

Figure 2:
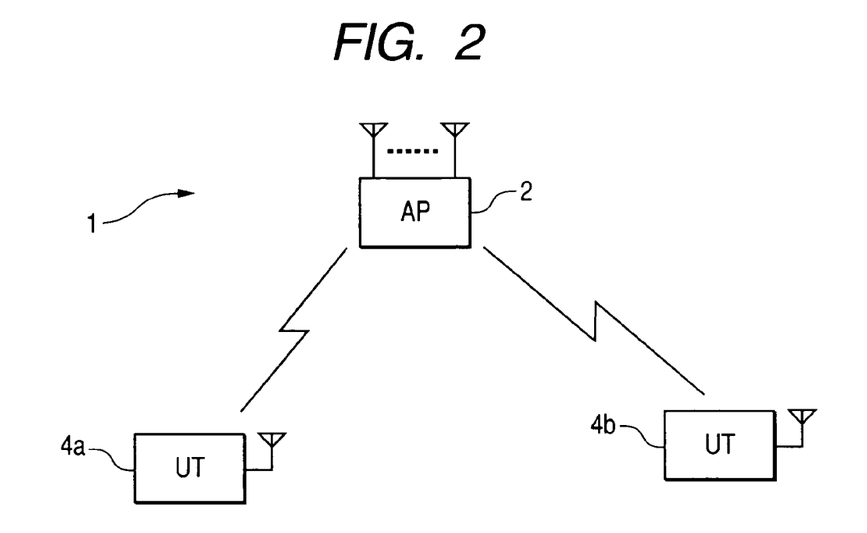
FIG. 2 illustrates the configuration of a radio communication system, according to a first embodiment of the invention.
Figure 3:
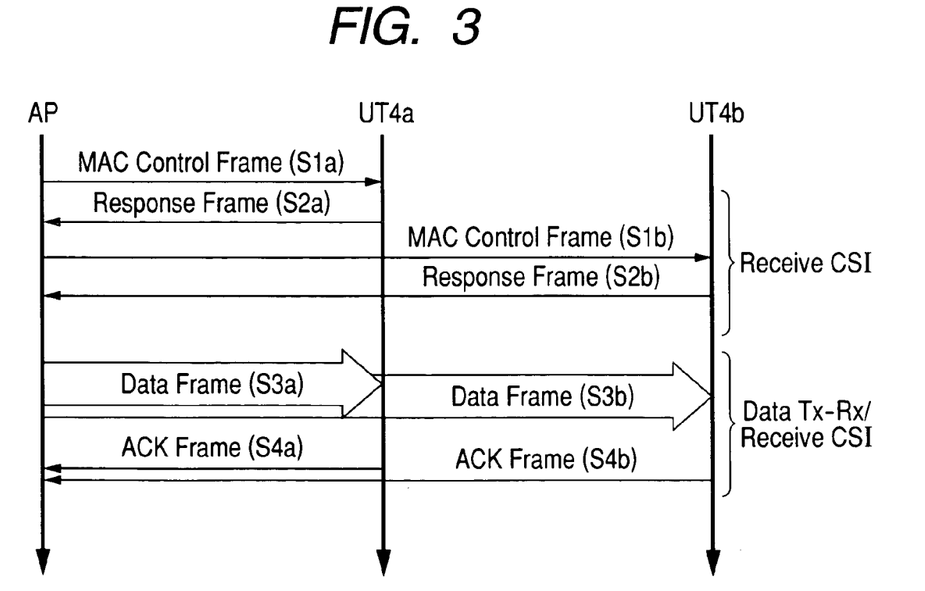
FIG. 3 illustrates CSI information acquisition, according to a first embodiment of the invention.

With reference to FIGS. 2 and 3, the following now explains how the CSI processor 300 acquires CSI in advance to a user terminal for transmission.

FIG. 2 illustrates a radio communication system I, which includes a wireless communication system of the invention functioning as an access point 2 and user terminals 4a and 4b based on the conventional wireless LAN standard. FIG. 3 illustrates the acquisition sequence of CSI information in the radio communication system of FIG. 2. Particularly, FIG. 3 shows frame exchange between the access point AP and user terminals UT 4a and 4b, and the vertical axis in the drawing denotes the time elapsed.

The access point transmits a MAC control frame to the user terminal 4a for the first time (S1a). Then, the user terminal 4a transmits a response frame to the MAC control frame (S2a). By receiving the response frame from the user terminal 4a, the access point can acquire CSI of the user terminal 4a. Likewise, the access point also transmits a MAC control frame to the user terminal 4b (S1b), and receives a response frame (S2b) therefrom, thereby acquiring CSI of the user terminal 4b. Here, CSI uses the symmetry of channel, i.e., channels are the same in the uplink and downlink communications between the access point and the user terminals, and therefore CSI of the uplink can be used as CSI of the downlink. Following the above-described sequence, it becomes possible to acquire CSI of a user terminal for transmission in advance.

Base on the acquired CSI, the access point can transmits data (S3a and S3b) simultaneously to the user terminals 4a and 4b using the same frequency. Here, since the user terminals 4a and 4b are of the conventional wireless LAN standard, if they receive all data frames, they transmit an ACK frame after a predetermined amount of time (S4a and S4b). Thus, CSI can be obtained by transmitting/receiving data.

Figure 4:
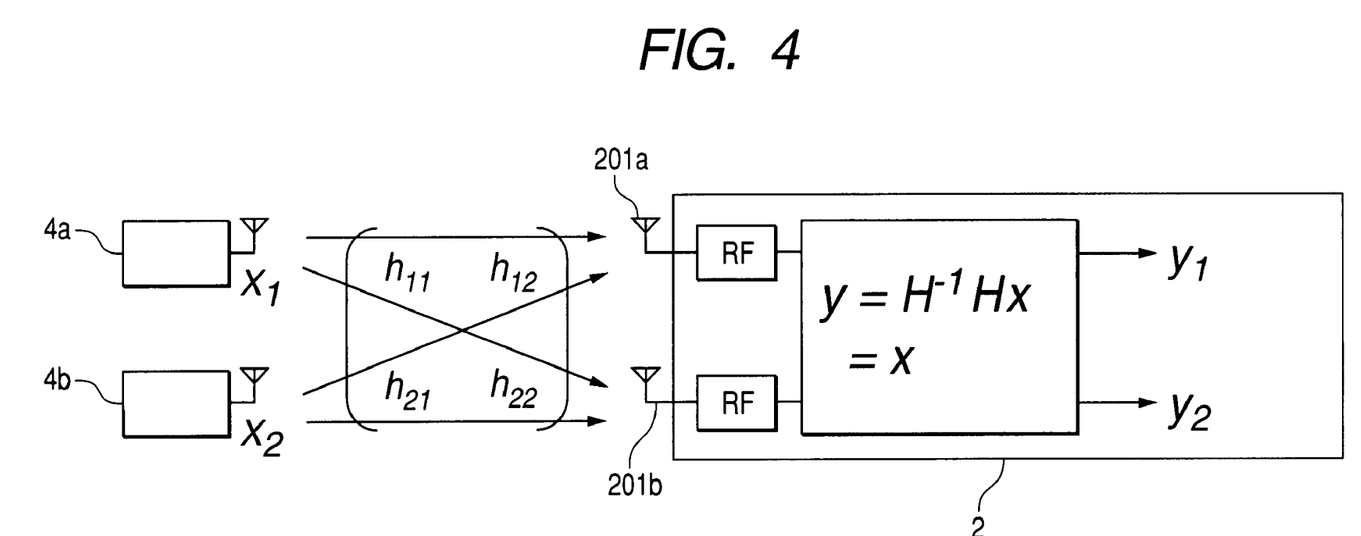
FIG. 4 illustrates the principle for MIMO processing, according to a first embodiment of the invention.

Referring to FIG. 4, the following now describes that although the access point receives signals simultaneously from plural user terminals within the same frequency, MIMO processing makes it possible to decompose the signals into transmission signals from the respective user terminals.

In the drawing, $h_{11}$ denotes a complex number representing gain and phase from the user terminal 4a to the antenna 201a of the access point 2, and $h_{21}$ denotes a complex number representing gain and phase from the user terminal 4a to the antenna 201b of the access point 2. Similarly, $h_{12}$ denotes a complex number representing gain and phase from the user terminal 4b to the antenna 201a of the access point 2, and $h_{22}$ denotes a complex number representing gain and phase from the user terminal 4b to the antenna 201b of the access point 2.

Accordingly, a 2×2 matrix H with elements $h_{11}$, $h_{12}$, $h_{21}$ and $h_{22}$ is obtained as described above. By multiplying an inverse matrix of H to the reception signal where transmission signals from the respective user terminals are mixed, the reception signal can be decomposed into transmission signals from the respective user terminals. At this time, although carrier frequency offset exists in the transmission signals from the respective user terminals, the reception signal can still be decomposed to transmission signals from the respective user terminals. The carrier frequency offset of each user terminal is corrected in the Sync 212 behind the Rx MIMO Proc1 30 as shown in FIG. 1.

Figure 5:
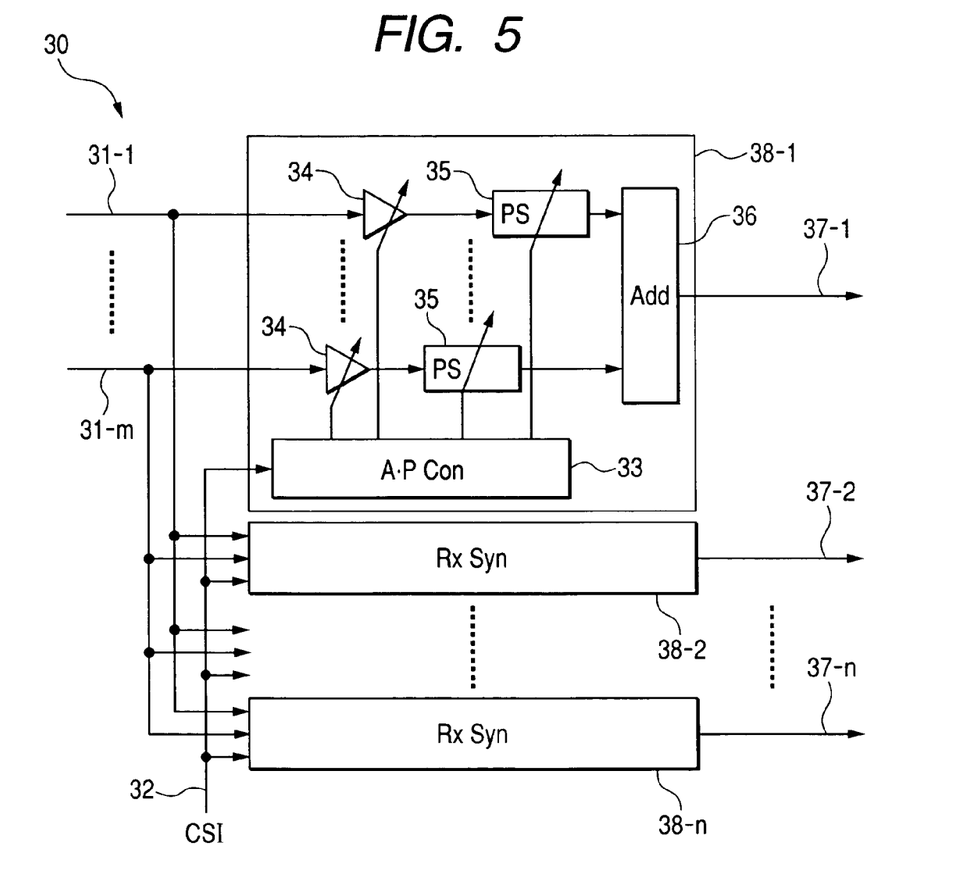
FIG. 5 illustrates the construction of a reception MIMO processor, according to a first embodiment of the invention.

The configuration of the Rx MIMO Proc1 30 is now explained with reference to FIG. 5. The Rx MIMO Proc1 30 includes a plurality of reception signal synthesizers Rx Syn 38 (38-1 to 38-n), each having an amplitude/phase controller A•P Con 33 that controls amplitude and phase, plural variable gain amplifiers 34 that change the amplitude by a predetermined amount, plural phase shifters PS 35 that change the phase per frequency by a predetermined amount, and an adder Add 36 that adds outputs of the plural phase shifters 35.

The signals each of the antennas 302 of the wireless communication system of this embodiment received are converted into baseband signals in the transceiving RF unit 301, and inputted to the Rx MIMO Proc1 30. That is, the Rx MIMO Proc1 30 receives the same number of inputs 31-1~31-m with the number of antennas, m. Each of these inputs 31-1~31-m are inputted to the Rx Syn 38-1~38-n, which are the same number with the number of user terminals, n, for reception. In each Rx Syn 38, the A•P Con 33 controls gains of the variable gain Amps 34 and phase shift of the PS 35, based on CSI 32. There are controlled in a manner that an output from the Add 36 is applied to a transmission signal from a certain user terminal only. Thus, an output from the Rx Syn 38 can output transmission signals from all user terminals as outputs 37-1~37-n of the Rx MIMO Proc1 30.

As explained so far, according to this embodiment, the Rx MIMO Proc1 30 is installed ahead of the FFT processor 205 in the receiving system, and MIMO processing is carried out prior to OFDM demodulation. Therefore, even if carrier frequency error exists among plural wireless communication systems in SDMA of uplink, demodulation can be done without substantially deteriorating BER characteristics at the receiving side. In other words, it is possible to receive transmission signals from plural wireless communication systems with different carrier frequencies.

In addition, in the wireless LAN system, although there is a wireless LAN terminal of the conventional standard, SDMA can be applied to a response frame of uplink. That is to say, in a wireless LAN system having an access point and plural user terminals, even if a wireless communication system based on the conventional standard (for example, IEEE802.11a or IEEE802.11g) which assumes that the user terminals do not use SDMA is used, SDMA can be realized by utilizing an access point according to this embodiment. Since uplink signals from user terminals can be transmitted simultaneously to the access point using the same frequency, total throughput of the system can be improved. Moreover, since transmission is done at once using the same frequency, usage efficiency of limited frequencies can be enhanced.

Second Embodiment

Figure 6:
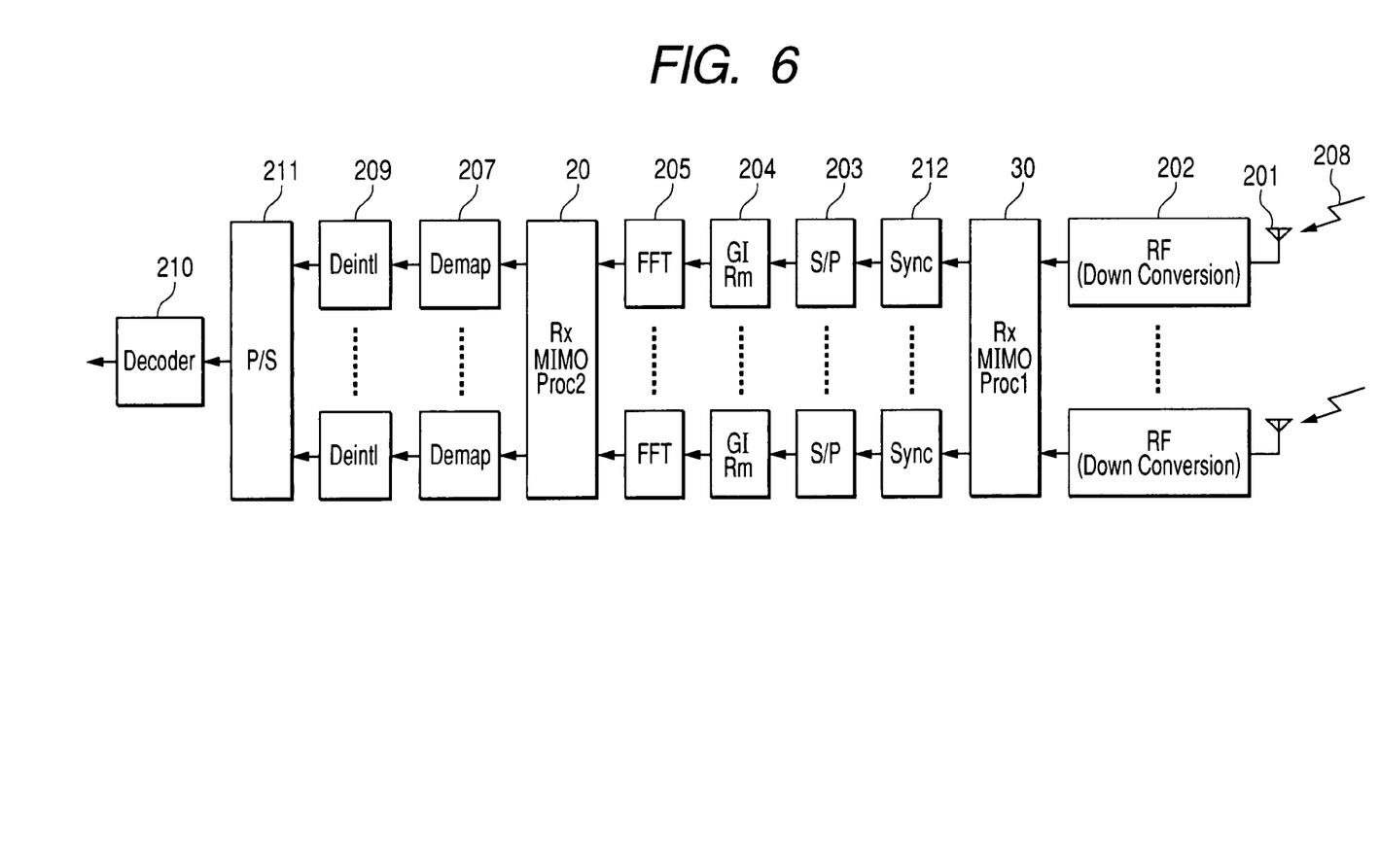
FIG. 6 illustrates the construction of a receiving system of a wireless communication system, according to a second embodiment of the invention.

A second embodiment of the invention is now explained with reference to FIG. 6.

In case of the first embodiment, in order to realize SDMA for user terminals with different carrier frequencies, MIMO processing was carried out prior to the FFT processing 205 that is part of OFDM demodulation. To implement the invention, there can be only one user terminal for communication. In this case, it is desired that MIMO processing is performed after FFT processing, as in the configuration of the conventional MIMO receiver. FIG. 6 illustrates, as the second embodiment, the configuration of a receiver of the wireless communication system for this case. In particular, FIG. 6 illustrates the receiving system only.

The wireless communication system of this embodiment includes an Rx MIMO Proc2 (second MIMO processor) 20 performing the conventional MIMO processing at the rear end of the FFT processor 205. In case of the typical point-to-point MIMO communication, demodulation is done using the Rx MIMO Proc2 20 bypassing the Rx MIMO Proc1 30. As for bypassing, input signals may be outputted as they are.

This is so because the Rx MIMO Proc1 30 can only perform MIMO processing independent of the influence of carrier frequency offset and cannot control amplitude or phase per frequency. Meanwhile, by carrying out MIMO processing after FFT processing, correction becomes easier in the case that gain and phase in the direction of frequency axis by frequency selective paging are not fixed.

As described so far, the second embodiment yield the same advantages as in the first embodiment can be obtained. Moreover, by putting the Rx MIMO Proc2 20 at the rear end of the FFT processor 205 for the construction of the receiver of the first embodiment, point-to-point MIMO communication besides SDMA can be realized.

In conclusion, the invention can be advantageously used for a transceiver of the radio communication system using plural antennas.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A wireless communication system simultaneously receiving OFDM signals within the same frequency band from plural transmitters, the wireless communication system comprising:

a plurality of antennas;

a first Multiple-Input Multiple-Output processor that decomposes a reception signal, from received mixed transmission signals from the plural transmitters, and received with the plural antennas, into transmission signals from the respective transmitters;

a FFT processor that carries out OFDM demodulation; and a demodulator that obtains data from signals which were previously converted into sub-carrier signals by the FFT processor, wherein, as for a processing sequence of the reception signal, the first MIMO processor is installed to provide processing ahead of the FFT processor.

2. The wireless communication system according to claim 1, comprising a second MIMO processor installed to provide processing after the FFT processor.

3. The wireless communication system according to claim 2, wherein the first MIMO processor includes a selectable bypass unit to output an input signal as it is.

4. The wireless communication system according to claim 3, wherein the first MIMO processor comprises:

variable gain amplifiers that change amplitude by a predetermined amount; and phase shifters that change phase per frequency by a predetermined amount.

5. The wireless communication system according to claim 4, comprising:

a CSI processor that uses channel information obtained between the wireless communication system and each of different wireless communication systems so as to change a configuration of a transmission signal from the wireless communication system to the different wireless communication systems.

6. The wireless communication system according to claim 5, wherein, as for obtaining channel information between the wireless communication system and each of the different wireless communication systems, the wireless communication system transmits a control frame requiring a response frame from the different wireless communication systems, and obtains the channel information using the response frames from the different wireless communication systems in response to the control frame.

* * * * *